United States Patent
Guzik et al.

(10) Patent No.: US 12,279,077 B2
(45) Date of Patent: Apr. 15, 2025

(54) AUTOMATED CAMERA ACTIVATION

(71) Applicants: Getac Technology Corporation, New Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, New Taipei (TW); WHP Workflow Solutions, Inc., North Charleston, SC (US)

(*) Notice: Subject to any disclaimer, the term of this patent is extended or adjusted under 35 U.S.C. 154(b) by 0 days.

(21) Appl. No.: 18/659,293

(22) Filed: May 9, 2024

(65) Prior Publication Data
US 2024/0291947 A1    Aug. 29, 2024

Related U.S. Application Data

(63) Continuation of application No. 17/490,787, filed on Sep. 30, 2021, now Pat. No. 12,010,464.

(51) Int. Cl.
*H04N 7/18* (2006.01)
*F41C 33/02* (2006.01)
(Continued)

(52) U.S. Cl.
CPC .......... *H04N 7/188* (2013.01); *F41C 33/029* (2013.01); *H04N 5/907* (2013.01); *H04N 23/661* (2023.01); *H04W 4/38* (2018.02)

(58) Field of Classification Search
None
See application file for complete search history.

(56) References Cited

U.S. PATENT DOCUMENTS

| | | |
|---|---|---|
| 2006/0098088 A1 | 5/2006 | Raghunath |
| 2008/0061991 A1 | 3/2008 | Urban |

(Continued)

FOREIGN PATENT DOCUMENTS

| | | |
|---|---|---|
| KR | 102067905 | 1/2020 |

OTHER PUBLICATIONS

Axon Signal Vehicle. Manual [online]. Axon Enterprise, Inc., 2019 [retrieved on Mar. 30, 2023]. Retrieved from the nternet: URL: <https://my.axon.com/sfc/servlel.shepherd/documenl/download/069f3000006LicYAAS>.

(Continued)

*Primary Examiner* — Hung Q Dang
(74) *Attorney, Agent, or Firm* — Finnegan, Henderson Farabow, Garrett & Dunner, L.L.P.

(57) ABSTRACT

Methods, systems, and apparatus, including computer programs encoded on a computer storage medium, for automated camera activation are disclosed. In one aspect, a method includes the actions of receiving, from a sensor, sensor data. The actions further include, based on the sensor data, determining that a firearm has been removed from a holster. The actions further include, based on determining that the firearm has been removed from the holster, generating a software-recognized event that indicates the firearm has been removed from the holster. The actions further include, in response to the software-recognized event that indicates the firearm has been removed from the holster, generating an instruction for a camera to record. The actions further include providing, for output, the instruction for the camera to record.

20 Claims, 5 Drawing Sheets

(51) Int. Cl.
*H04N 5/77* (2006.01)
*H04N 5/907* (2006.01)
*H04N 23/60* (2023.01)
*H04N 23/661* (2023.01)
*H04W 4/38* (2018.01)

(56) References Cited

U.S. PATENT DOCUMENTS

| | | |
|---|---|---|
| 2011/0018998 A1 | 1/2011 | Guzik |
| 2015/0176937 A1 | 6/2015 | Sullivan et al. |
| 2015/0301581 A1 | 10/2015 | Ding |
| 2016/0173832 A1* | 6/2016 | Stewart ............... F41A 17/20 |
| | | 348/158 |
| 2016/0190859 A1 | 6/2016 | Blum et al. |
| 2016/0283860 A1 | 9/2016 | Pycock |
| 2017/0003101 A1* | 1/2017 | Madrid ............... F41C 33/029 |
| 2018/0075562 A1 | 3/2018 | Hanchett, Jr. et al. |
| 2018/0100713 A1* | 4/2018 | Patches ............... G08B 25/004 |
| 2019/0034157 A1 | 1/2019 | Steinberg |
| 2019/0197354 A1 | 6/2019 | Law |
| 2020/0355464 A1 | 11/2020 | Estes, III et al. |
| 2021/0272131 A1* | 9/2021 | Enabosi ............... H04N 23/65 |

OTHER PUBLICATIONS

Back-End Client (Back-End Application). Operating Instructions [online]. Panasonic System Networks Co., Lid., 2017 retrieved on Mar. 30, 2023]. Retrieved from the Internet: URL: <https://manualsbrain.com/en/manuals/780707/>.

Body Worn Camera. Important Information [online]. Panasonic Corporation, 2009 [retrieved on Mar. 30, 2023]. Retrieved rom the Internet: URL: <hllps://www.manualslib.com/manual/1302317/Panasonic-Wv-Tw370.html>.

International Patent Application No. PCT/US2022/045060, International Search Report and Written Opinion mailed Jan. 26, 2023, 9 pages.

Memory Card Video Recorder. Operating Instructions [online]. Panasonic Corporation, 2009 [retrieved on Mar. 30, 2023]. Retrieved from the Internet: URL: <hllps://www.manualslib.com/manual/885169/Panasonic-Ag-Cpd20p.html>.

Remote activation from CAD settings. Respond Web [online]. Axon Enterprise, Inc., 2021 [retrieved on Mar. 30, 2023]. Retrieved from the Internet: URL: <hllps://my.axon.com/s/article/Respond-Remote-Activation-from-CAD-Settings?anguage=en_US>.

* cited by examiner

AUTOMATED CAMERA ACTIVATION

CROSS REFERENCE TO RELATED APPLICATIONS

This application is a continuation application based on U.S. application Ser. No. 17/490,787, filed Sep. 30, 2021, the contents of each application is incorporated herein by reference in its entirety.

BACKGROUND

A body camera or wearable camera is a wearable audio, video, or photographic recording system used to record events in which law enforcement officers are involved. A camera is typically worn on the torso of the body on the officer's uniform. An officer may activate the recording feature of a body camera by pressing a button on the camera, for example.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Body cameras are becoming a common accessory for police officers. The video footage from an officer's body camera can provide valuable evidence of the actions and interactions of the officer. While the footage from the camera may be helpful, it is impractical for the body camera to continuously record, stream, or otherwise output video and/or audio the entire time that the officer is wearing the camera. For the body camera to store footage from an officer's entire shift, the size of the camera would be prohibitive because of the memory and battery requirements needed to store hours of video data. Because of this limitation, many body cameras require that the officer manually activate the recording feature and deactivate the recording feature. While manually controlling the recording feature of the body camera may be sufficient for routine scenarios, there may be situations where the officer forgets to activate the recording feature, or the officer is required to act quickly and does not have time to activate the recording feature.

In order to relieve the officer of having to manually activate, the body camera may be paired with a sensor that is configured to detect the presence of the officer's firearm in the holster. The sensor may be configured to transmit raw sensor data to the body camera or another device on the officer's person. The body camera or the other device may receive the raw sensor data and determine whether the firearm is likely in or out of the holster. Based on the likely location of the firearm, the body camera may activate or deactivate the recording feature automatically. The body camera may be set up to record if the firearm is outside of the holster and cease recording if the firearm is in the holster.

Figure 1:
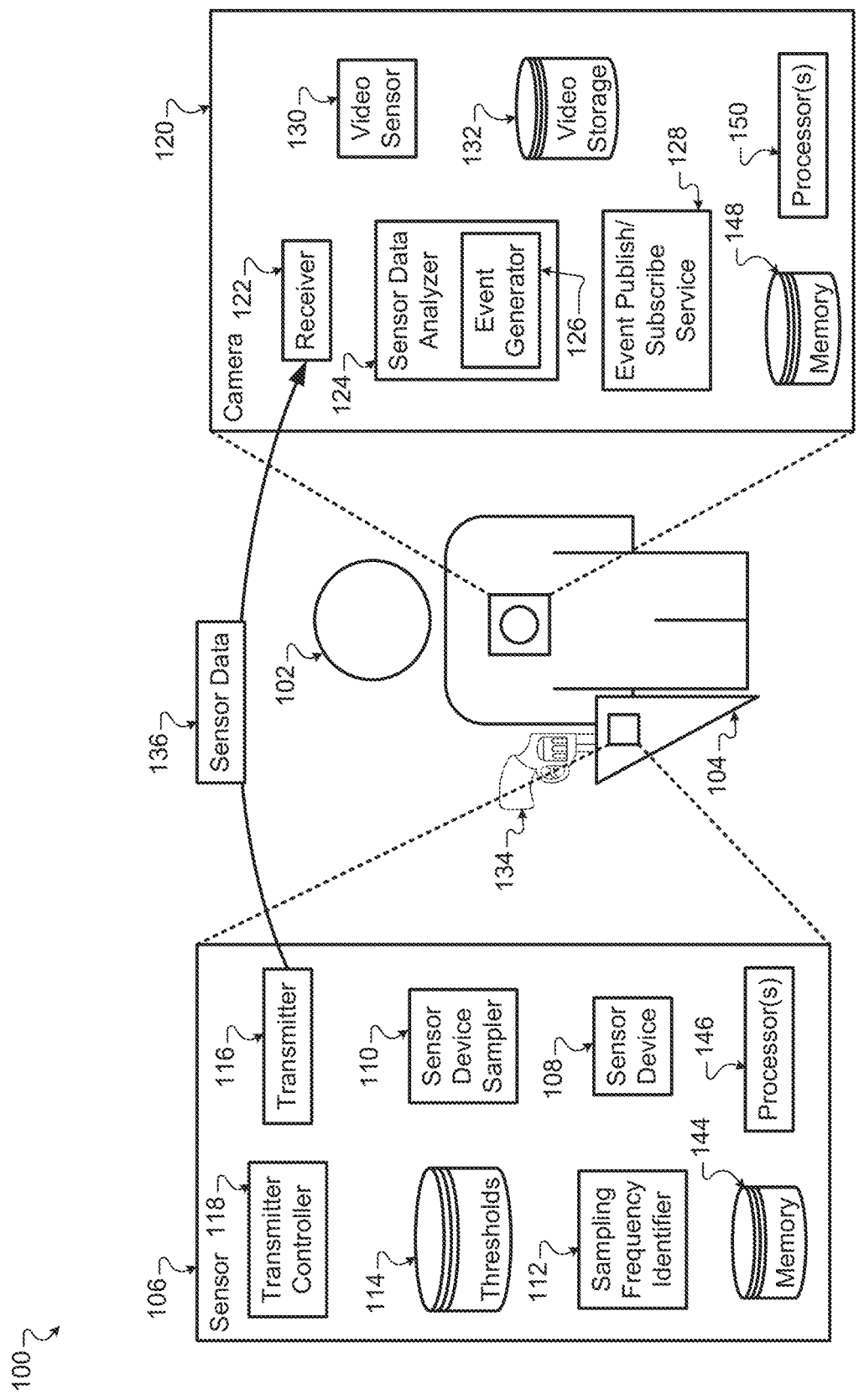
FIG. 1 illustrates an example system that is configured to activate and deactivate a body camera based on whether a firearm is in a holster.

FIG. 1 illustrates an example system 100 that is configured to activate and deactivate a body camera 120 based on whether a firearm 134 is in a holster 104. Briefly, and as described in more detail below, the user 102 is carrying a firearm 134 in a holster 104. The holster 104 includes a sensor 106 that generates sensor data 136 based on the presence and/or movement of the firearm 134. The camera 120 receives the sensor data 136 and determines whether the firearm 134 has been removed from or placed in the holster. Based on that determination, the camera 120 may activate or deactivate a recording function of the video sensor 130.

In more detail, the user 102 may be a police officer who is carrying a firearm 134 and wearing a body camera 120. The user 102 may keep the firearm 134 in the holster 104 that may be located on the hip of the user 102. The body camera 120 may be located on the chest of the user 102. The body camera 120 may include a video sensor 130. When the camera 120 is recording, the video data captured by the video sensor 130 may be stored in the video storage 132. When the camera 120 is not recording, the video sensor 130 may be inactive or video data captured by the video sensor 130 may not be stored in the video storage 132.

In some implementations, the user 102 may manually activate and deactivate the recording feature of the camera 120. In some instances, the camera 120 may include a button that the user 102 may press to activate and deactivate the recording feature of the camera 120. While this method of activation and deactivation may be sufficient for routine situations such as traffic stops, requiring manual activation and deactivation of the recording function may be insufficient for higher stress or fast-moving situations. In these cases, it may be beneficial for the camera 120 to activate or deactivate the recording feature based on detecting other actions such as removing or placing the firearm 134 in the holster 104.

The holster 104 may include a sensor 106. The sensor 106 may be configured to provide raw sensor data 136 that is the sampled sensor data generated by the sensor device 108 to the camera 120. Based on the sensor data 136, the camera 120 may determine whether the firearm 134 is located in the holster 104 or out of the holster 104. If the firearm 134 is likely located in the holster 104, then the camera 120 may store the video data captured by the video sensor 130 in the video storage 132. If the firearm 134 is likely located outside of the holster 104, then the camera 120 may bypass storing the video data captured by the video sensor 130 in the video storage 132.

The sensor device 108 may be any type of hardware that is configured to generate an electronic signal based on the presence of another object. For example, the sensor device 108 may be a metal detector that generates an electronic signal based on the distance between the sensor device 108 and a metal object such as the firearm 134. As another example, the sensor device 108 may be a proximity detector that generates an electronic signal based on the distance between the sensor device 108 and another object. As another example, the sensor device may be two-part device that includes a source and a detector. The source may generate a signal such as infrared light. The detector may be located in a position such that the source directs the signal towards the detector. The source and detector may be positioned in the holster 104 such that when the firearm 134 is in the holster, the firearm 134 blocks the signal from reaching the detector. When the firearm 134 is out of the holster, the detector receives the signal from the source.

The sensor 106 may include sensor device sampler 110. The sensor device sampler 110 may be implemented by one or more processors 146 executing software stored in a computer-storage media 144. The sensor device sampler 110 may be configured to sample the electronic signal generated by the sensor device 108. The sensor device sampler 110 may sample the electronic signal at varying rates depending on the instructions received by the sampling frequency identifier 112. The sampling frequency identifier 112 may be configured to compare the sampled sensor data to the thresholds 114. The sampling frequency identifier 112 may be implemented by one or more processors 146 executing software stored in the computer-storage media 144. The thresholds 114 may include one or more sampled sensor data thresholds or ranges to compare to the sampled sensor data and may be stored in the computer-storage media 144. The sampled sensor data thresholds may correspond to various sampling frequencies. Based on the sampled sensor data threshold that the sampled sensor data satisfies, the sampling frequency identifier 112 identifies the corresponding frequency and instructs the sensor device sampler 110 to sample at that frequency.

The computer-readable media 144 may include one or more types of computer-readable media such as computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

As an example of the operation of the sensor device 108 and the sensor device sampler 110, the sensor device 108 may be a metal detector that generates an electronic signal that is directly related to the distance between a metal object and the sensor device 108. The voltage of the electronic signal may be directly related to the distance between a metal object and the sensor device. This may result in an electronic signal of a lower voltage when a metal object is near the sensor device 108 and an electronic signal of a higher voltage when a metal object is far from the sensor device 108. The sensor device sampler 110 may sample the electronic signal generated by the sensor device 108 and generate sampled sensor data values that may be voltages between 0.0 and 1.0 volts. The sampled sensor data value of 0.0 volts may occur when the electronic signal is at its lowest level, and a sampled sensor data value of 1.0 volts may occur when the electronic signal is at its highest level.

In some implementations, the thresholds 114 may include two sampled sensor data thresholds. A lower sampled sensor data threshold may be 0.3 volts and an upper sampled sensor data threshold 0.7 volts. When the sampled sensor data value is below 0.3 volts, the sampling frequency identifier 112 may instruct the sensor device sampler 110 to sample the output of the sensor device 108 every ten seconds. A sampled sensor data value below 0.3 volts may likely correspond to the firearm 134 being in the holster 104. When the sampled sensor data value is above 0.7 volts, the sampling frequency identifier 112 may instruct the sensor device sampler 110 to sample the output of the sensor device 108 every ten seconds. A sampled sensor data value above 0.7 volts may likely correspond to the firearm 134 being out of the holster 104. When the sampled sensor data value is between 0.3 volts and 0.7 volts, the sampling frequency identifier 112 may instruct the sensor device sampler 110 to sample the output of the sensor device 108 every ten milliseconds. A sampled sensor data value between 0.3 volts and 0.7 volts may likely correspond to the firearm 134 being placed in or removed from the holster 104.

In some implementations, the thresholds 114 may include multiple sampled sensor data ranges. For example, the thresholds 114 may include ten sampled sensor data ranges. If the sampled sensor data value is between 0.0 volts and 0.1 volts, then the sampling frequency identifier 112 may instruct the sensor device sampler 110 to sample the output of the sensor device 108 every ten seconds. If the sampled sensor data value is between 0.1 volts and 0.2 volts, then the sampling frequency identifier 112 may instruct the sensor device sampler 110 to sample the output of the sensor device 108 every ten five seconds. If the sampled sensor data value is between 0.4 volts and 0.5 volts, then the sampling frequency identifier 112 may instruct the sensor device sampler 110 to sample the output of the sensor device 108 every millisecond. If the sampled sensor data value is between 0.5 volts and 0.6 volts, then the sampling frequency identifier 112 may instruct the sensor device sampler 110 to sample the output of the sensor device 108 every millisecond. If the sampled sensor data value is between 0.6 volts and 0.7 volts, then the sampling frequency identifier 112 may instruct the sensor device sampler 110 to sample the output of the sensor device 108 every ten milliseconds. Other ranges may correspond to different sampling frequencies.

The sensor device sampler 110 may provide the sampled sensor data to the transmitter 116. The transmitter 116 may be configured to transmit the sampled sensor data 136 to the camera 120. In some implementations, the transmitter 116 may communicate with the receiver 122 of the camera 120 using a wireless connection such as a short-range radio, infrared, and/or any other type of wireless communications. In some implementations, the transmitter 116 may communicate with the receiver 122 of the camera 120 using a wired connection.

The sensor 106 may include a transmitter controller 118. The transmitter controller 118 may be implemented by one or more processors 146 executing software stored in the computer-storage media 144. The transmitter controller 118 may be configured to activate and deactivate the transmitter 116. By preventing the transmitter 116 from continuously transmitting the sensor data 136 to the receiver 122, the transmitter controller 118 may help preserve the battery power of the sensor 106. The transmitter controller 118 may determine to activate or deactivate the transmitter based on the sampled sensor data. The thresholds 114 may include a transmitter activation threshold and a transmitter deactivation threshold.

In some implementations, the transmitter activation threshold and the transmitter deactivation threshold may correspond to sampled sensor data values. If the sampled sensor data value is below a lower threshold, then the transmitter controller 118 deactivates the transmitter 116. If the sampled sensor data value is above an upper threshold, then the transmitter controller 118 deactivates the transmitter 116. If the sampled sensor data value is between the upper threshold and lower threshold, then the transmitter controller 118 activates the transmitter 116. For example, the upper threshold may be 0.8 volts and the lower threshold may be 0.2 volts. If the sampled sensor data value is less than 0.2 volts or greater than 0.8 volts, then the transmitter controller 118 deactivates the transmitter 116. If the sampled sensor data value is between 0.2 volts and 0.8 volts, then the transmitter controller 118 activates the transmitter 116.

In some implementations, the transmitter activation threshold and the transmitter deactivation threshold may correspond to sampling frequencies. If the sampling frequency is below a threshold, then the transmitter controller 118 deactivates the transmitter 116. If the sampling frequency is above the threshold, then the transmitter controller 118 activates the transmitter 116. For example, the threshold may be one sample every one hundred milliseconds. If the sampling frequency is less frequent than one sample every one hundred milliseconds, then the transmitter controller 118 may deactivate the transmitter 116. If the sampling frequency is more frequent than one sample every one hundred milliseconds, then the transmitter controller 118 may activate the transmitter 116.

The receiver 122 of the camera 120 may receive the sensor data 136 from the transmitter 116 of the sensor 108. As described above, the sensor data 136 includes sampled sensor data of the electronic signal generated by the sensor device 108. The sensor data 136 may not include data indicating whether the firearm 134 is in or out of the holster 104. In other words, the sensor data 136 is raw data and the camera 120 analyzes the sensor data 136 to determine whether the firearm 134 is in or out of the holster 104.

The camera 120 may include a sensor data analyzer 124. The sensor data analyzer 124 may be implemented by one or more processors 150 executing software stored in a computer-storage media 148. The sensor data analyzer 124 may be configured to analyze the sensor data 136 and determine whether the firearm 134 is in or out of the holster 104. If the sensor data analyzer 124 determines that the firearm 134 is in the holster 104, then the event generator 126 of the sensor data analyzer 124 may generate a software-recognized event that indicates that the firearm 134 is in the holster 104. If the sensor data analyzer 124 determines that the firearm 134 is out of the holster 104, then the event generator 126 of the sensor data analyzer 124 may generate a software-recognized event that indicates that the firearm 134 is out of the holster 104.

The sensor data analyzer 124 may use various techniques to analyze the sensor data 136. In some implementations, the sensor data analyzer 124 may use rules to determine whether the firearm 134 is in the holster 104. The rules may specify sensor data values, sensor data ranges, time periods, and/or other metrics to use to analyze the sensor data 136. Some rules may specify that if the sensor data 136 is greater than an upper threshold for at least a period of time, then the firearm 134 is out of the holster 104, and if the sensor data 136 is less than a lower threshold for at least a period of time, then the firearm 134 is in the holster 104. For example, the upper threshold may be 0.9 volts and the time period may be one second. Therefore, if the sensor data 136 remains above 0.9 volts for at least one second, then the sensor data analyzer 124 may determine that the firearm 134 is out of the holster 104. The lower threshold may be 0.1 volts and the time period may be one second. Therefore, if the sensor data 136 remains below 0.1 volts for at least one second, then the sensor data analyzer 124 may determine that the firearm 134 is in the holster 104.

In some implementations, the sensor data analyzer 124 may use models to determine whether the firearm 134 is in the holster 104. The models may be trained using machine learning and previous sensor data collected from other sensors and data indicating whether there was a firearm in the corresponding holster. The models may be configured to receive the sensor data 136 and output data indicating whether the firearm 134 is in the holster 104. In some implementations, one or more of the models may be configured to continuously receive the sensor data 136 as the receiver 122 receives the sensor data 136 from the transmitter 116. The one or more models may output data indicating whether the firearm 134 is in the holster 104 based on a confidence score satisfying a confidence score threshold. For example, a model may receive two sensor data samples. Based on those two sensor data samples, the model may determine that the firearm 134 is out of the holster 104 with a confidence score of 0.4 volts. The confidence score threshold may be 0.7 volts. The model may receive an additional sensor data sample. With the additional sensor data sample, the model may determine that the firearm 134 is out of the holster 104 with a confidence score of 0.8, which satisfies the confidence score threshold of 0.7 volts. Based on the confidence score satisfying the confidence score threshold, the model may output data indicating that the firearm 134 is out of the holster 104.

By using models and/or rules to analyze the sensor data 136, the sensor data analyzer 124 may increase the likelihood of false positives and other determinations that do not reflect the position of the firearm 134. For example, if the user 102 may unhook the firearm 134 from the holster 104. This action may cause the firearm 134 to jostle in the holster 104, which may cause a change in the electronic signal generated by the sensor device 108. The change may be significant enough for the transmitter controller 118 to activate the transmitter 116. The sensor data analyzer 124 may analyze the sensor data 136 and determine that the firearm 134 is likely still in the holster 104. A similar situation may occur when the firearm 134 is out of the holster 104. The user 102 may briefly place the barrel of the firearm 134 in the holster 104. This may occur if the user 102 attempt to place the firearm 134 in the holster 104, and then the user 102 changes his/her mind and keeps the firearm 134 out of the holster 104. In this case, the transmitter controller 118 may activate the transmitter 116. The sensor data analyzer 124 may analyze the sensor data 136 and determine that the firearm 134 is likely still out of the holster 104.

The event generator 126 may generate a software-recognized event indicating the state of the firearm 134 relative to the holster. In some implementations, the event generator 126 may generate a software-recognized event when the likely state of the firearm 134 changes. For example, the event generator 126 may generate a software-recognized event when the firearm 134 is placed in the holster 104. In some implementations, the event generator 126 may continuously generate software-recognized events that indicate the likely state of the firearm 134. In some implementations, the event generator 126 may generate the software-recognized event such that it complies with the message queueing telemetry transport protocol.

The camera 120 may include an event publish/subscribe service 128. The event publish/subscribe service 128 may be implemented by one or more processors executing software stored in the computer-storage media 148. The event publish/subscribe service 128 may be configured to receive the software-recognized event from the event generator 126 and provide the software-recognized event to the devices, entities, and/or locations that subscribed to the software-recognized events of the sensor data analyzer 124. In some implementations, the event publish/subscribe service 128 may implement a publish/subscribe service using the message queueing telemetry transport protocol. Some of the other entities that may subscribe to the software-recognized events of the sensor data analyzer 124 may include a police dispatcher, a records office, and/or any other similar entity.

The sensor data analyzer 124 may be configured to generate instructions for the video sensor 130 in response to determining whether the firearm 134 is likely in the holster 104. The sensor data analyzer 124 may generate an instruction for the video sensor 130 to store video data in the video storage 132 based on determining that the firearm 134 is likely out of the holster 104. The sensor data analyzer 124 may generate an instruction for the video sensor 130 to cease storing video data in the video storage 132 based on determining that the firearm 134 is likely in the holster 104.

In some implementations, the camera 120 may also include a microphone. The microphone may be configured to activate based on the event generator 126 generating an event that indicates the firearm 134 is out of the holster 104 and deactivate based on the event generator 126 generating an event that indicates the firearm 134 is in the holster 104. The microphone may store the audio data in memory when active.

In some implementations, the camera 120 may be configured to output the video data generated by the video sensor to other computing devices, such as a server. This may be the case if the camera 120 is streaming the video data. In some instances, the video sensor 130 may store the video data in the video storage 132 and the camera 120 may stream the video data. In some implementations, the camera 120 may store and/or stream audio data generated by a microphone.

Figure 2:
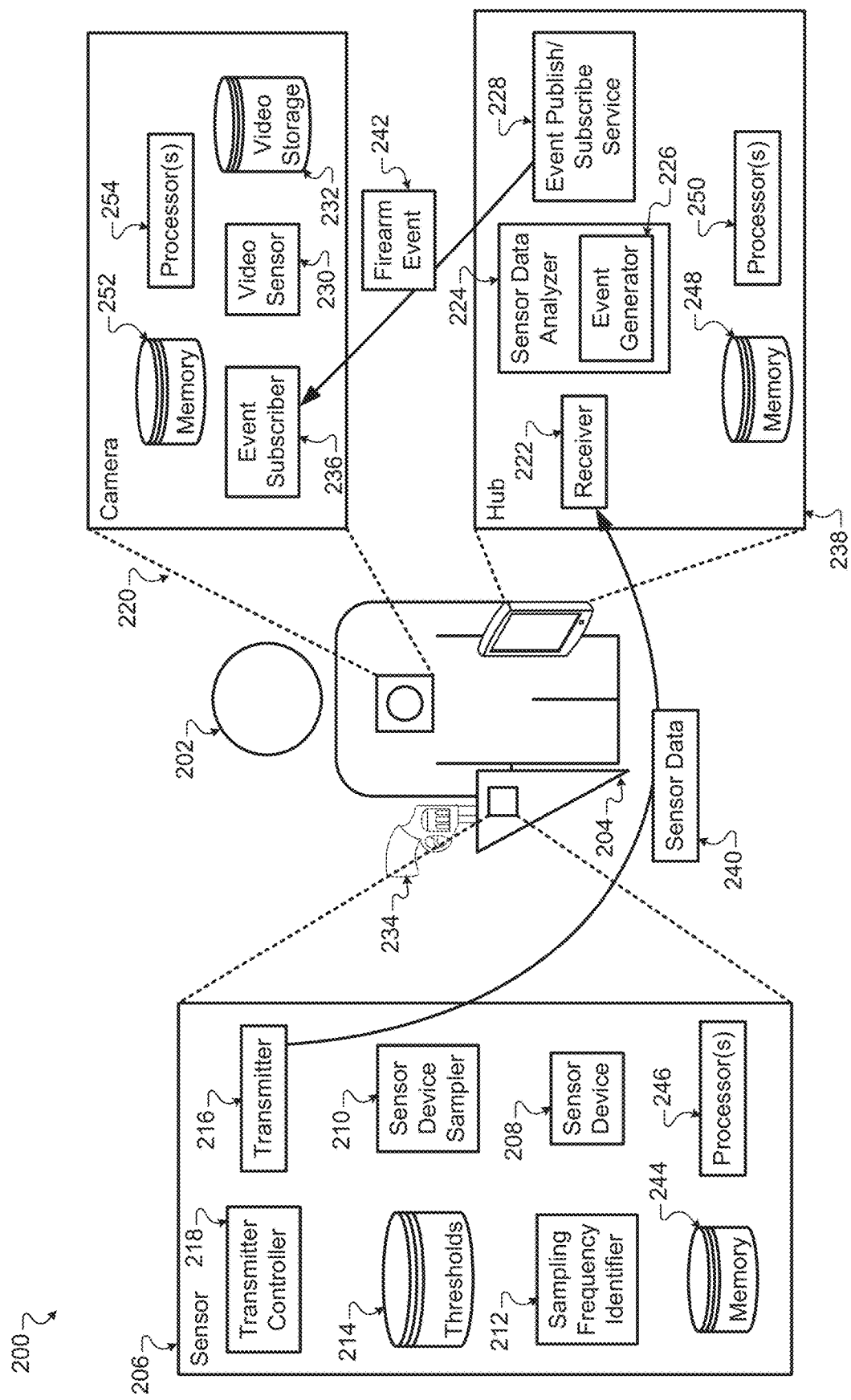
FIG. 2 illustrates an example system that is configured to generate a software-recognized event based on whether a firearm is in a holster.

FIG. 2 illustrates an example system 200 that is configured to generate a software-recognized event 242 based on whether a firearm 234 is in a holster 204. Briefly, and as described in more detail below, the user 202 is carrying a firearm 234 in a holster 204. The holster 204 includes a sensor 204 that generates sensor data 240 based on the presence and/or movement of the firearm 234. The hub 238 receives the sensor data 240 and determines whether the firearm 234 has been removed from or placed in the holster 204. Based on that determination, the hub 238 may generate a firearm event 242 that indicates that the firearm 234 has been removed from or placed in the holster 204. The camera 220 may subscribe to the firearm event 242. In response to receiving the firearm event 242, the camera 220 may activate or deactivate a recording function of the video sensor 230.

In more detail, the user 202 may be a police office who is carrying a firearm 234, wearing a body camera 220, and carrying a communications hub 238. The user 202 may keep the firearm 234 in the holster 204 that may be located on the hip of the user 202. The body camera 220 may be located on the chest of the user 202. The body camera 220 may include a video sensor 230. When the camera 220 is recording, the video data captured by the video sensor 230 may be stored in the video storage 232. When the camera 220 is not recording, the video sensor 230 may be inactive or video data captured by the video sensor 230 may not be stored in the video storage 232.

Similar to FIG. 1, the user 202 may manually activate and deactivate the recording feature of the camera 220 by pressing a button. The holster 204 may include a sensor 206. The sensor 206 may be similar to the sensor 106 of FIG. 1. The sensor device 208, the sensor device sampler 210, the sampling frequency identifier 212, the thresholds 214, the transmitter controller 218, and the transmitter 216 may be similar to the sensor device 108, the sensor device sampler 110, the sampling frequency identifier 112, the thresholds 114, the transmitter controller 118, and the transmitter 116 of the sensor 106 of FIG. 1, respectively. The sensor data 240 outputted by the transmitter 216 may be similar to the sensor data 140 outputted by the transmitter 216 of FIG. 1.

The camera 220 and the communications hub 238 may include some similar components to the camera 120 of FIG. 1. In the implementation of FIG. 2, the components are split between the camera 220 and the communications hub 238. The communications hub 238 may be any type of computing device that is configured to communicate with other electronic devices. For example, the communications hub 238 may be a mobile phone, a radio, a tablet, a smart watch, a laptop, camera, or any other similar type of device.

The communications hub 238 may include a receiver 222, a sensor data analyzer 224, an event generator 226, and an event publish/subscribe service 228. The receiver 222, sensor data analyzer 224, event generator 226, and event publish/subscribe service 228 may be similar to the receiver 122, the sensor data analyzer, the event generator 126, and the event publish/subscribe service 128 of the camera 120 in FIG. 1, respectively.

The event publish/subscribe service 228 may receive a software-recognized event from the event generator 226. The software-recognized event may indicate that the firearm 234 is in the holster 204 or that the firearm 234 is out of the holster 204. The event publish/subscribe service 228 may output a firearm event 242 that includes data indicating whether the firearm 234 is in the holster 204 or that the firearm 234 is out of the holster 204. In some implementations, the software-recognized event may indicate changes in the location of the firearm 234, such as when the firearm 234 is removed from the holster 204 or when the firearm 234 is placed in the holster 204. In some implementations, the software-recognized event may indicate location of the firearm 234 independent of whether the location of the firearm 234 has changed.

The camera 220 may include an event subscriber 236. The event subscriber 236 may subscribe to firearm events generated by the event publish/subscribe service 228. The event subscriber 236 implement a subscriber using the message queuing telemetry transport protocol. The event subscriber 236 may be implemented by one or more processors 254 executing software stored in a computer-storage media 252. In response to receiving the firearm event 242, the event subscriber 236 may determine whether the firearm event 242 indicates whether the firearm 234 is in or out of the holster 204. If the firearm event 242 indicates that the firearm 234 is in the holster 204, then the event subscriber 236 may instruct the video sensor 230 to cease storing video data in the video storage 232. If the firearm event 242 indicates that the firearm 234 is out of the holster 204, then the event subscriber 236 may instruct the video sensor 230 to store video data in the video storage 232. The video sensor 230 and the video storage 232 may be similar to the video sensor 130 and the video storage 132 of FIG. 1, respectively.

In some implementations, the technology illustrated in FIGS. 1 and 2 can be extended to other event detection situations. The user 102 may be carrying other equipment that may have sensors similar to the sensor 106. For example, the user 102 may be carrying a baton, taser, handcuffs, and/or any other similar type of equipment. The holder for each of these pieces of equipment may include a sensor similar to the sensor 106. When the equipment is placed in or removed from the holder, then the event generator 126 of the sensor data analyzer 124 may generate an event that indicates the placement or removal of the equipment. The event generator 126 may provide that event to the event publish/subscribe service 128 where various devices may subscribe to those events.

Because the event generator 126 provides the events to the event publish/subscribe service 128, different types of devices may subscribe to and act on those events. For example, the user 102 may be carrying a radio that may begin or cease to receive and output audio data in response to an unholstering event or a holstering event, respectively. Other devices that subscribe to and act on those events may be devices that user 102 is not carrying around. For example, an audible alarm, a silent alarm, a central station, a dispatch system, devices located in a vehicle, and/or any other similar device may subscribe to the events.

In some implementations, devices may subscribe to events and determine whether to act on them based on the location of the event. In this case, the event may include data related to the location of the sensor 106. The sensor data analyzer 124 may receive data indicating a location of the sensor 106 in advance of generating an event. For example, the sensor data analyzer 124 may receive the location of the sensor 106 during the setup process. The location may be indicated as on the user 102. The sensor data analyzer 124 may receive data indicating that the camera 120 is also on the user 102. The camera 120 may include a location detector such as a GPS receiver or other device to determine the location of the camera 120. The event generator 126 may generate an event indicating the location of the firearm 134, determine that the sensor 106 and the camera 120 are on the user 120, access the location data from the location detector, and include, in the event, the location generated by the location detector.

The other devices that may act on an event based on the location of the event may be other body cameras, stationary cameras, alarms, microphones, and/or any other similar devices. For example, a camera may be located on the body of a nearby user. If an event subscriber of the camera of the nearby user subscribes to firearm events, and the camera 120 determines that the firearm event occurred within a threshold distance, such as one mile of the camera of the nearby user, then the camera of the nearby user may begin recording and/or streaming video data.

Figure 3:
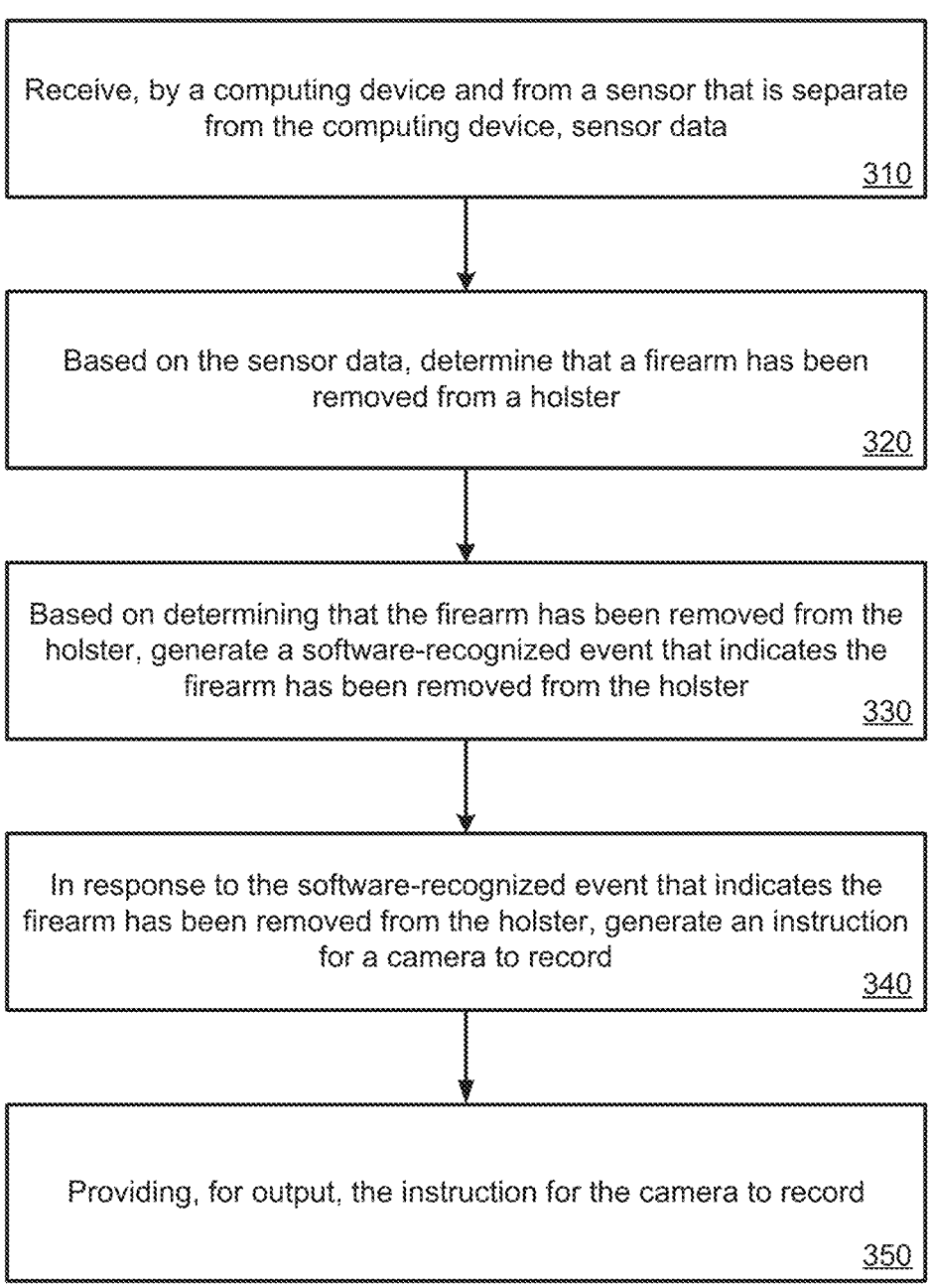
FIG. 3 is a flowchart of an example process for activating and deactivating a body camera based on whether a firearm is in a holster.

FIG. 3 is a flowchart of an example process 300 for activating and deactivating a body camera 120 based on whether a firearm 134 is in a holster 104. In general, the process 300 receives sensor data from a sensor. The process 300 analyzes the sensor data and determines that the firearm 134 has been removed from the holster 104. The process 300 instructs the video sensor 130 of the camera 120 to begin recording. The process 300 will be described as being performed by the system 100 of FIG. 1 and will include references to components of the sensor 106 and the camera 120 in FIG. 1.

The camera 120 receives, from a sensor 106 that is separate from the camera 120, sensor data (310). In some implementations, the camera 120 and the sensor 106 communicate over a wireless communication channel. In some implementations, the sensor 106 is configured to sample an electronic signal generated by a sensor device 108 of the sensor 106 and transmit the sampled electronic signal to the camera 120. The sensor data may include the sampled electronic signal. In some implementations, the sensor 106 is configured to transmit the sampled electronic signal to the camera 120 in response to determining that the sampled electronic signal satisfies a sampled electronic signal threshold. In some implementations, the sensor 106 is configured to sample the electronic signal at varying sampling frequencies based on the sampled electronic signal.

Based on the sensor data 136, the camera 120 determines that a firearm has been removed from a holster (320). In some implementations, the camera 120 may analyze the sensor data 136 using one or more rules. The one or more rules may specify patterns, thresholds, timing, and/or any other characteristic to identify in the sensor data 136. For example, a rule may specify that if the sensor data 136 includes sampled electronic signal values above a threshold for at least one second, then the firearm 134 is likely out of the holster 104. Another rule may specify that if the sensor data 136 includes sampled electronic signal values below a threshold for at least one second, then the firearm 134 is likely in the holster 104.

In some implementations, the camera 120 may analyze the sensor data 136 using one or more models. The models may be trained using machine learning and historical sensor data that is labeled as corresponding to the firearm in the holster or out of the holster. The camera 120 or another computing device may include a model trainer trains the models. The model trainer may generate data samples using the historical sensor data. Each data sample may include one or more sampled electronic signal values and a label indicating whether the firearm is in or out of the holster. The data sample may include that time that elapsed between the sampling of the electronic signal. The model trainer may group the data samples according to type of sensor. For example, data samples from a first type of infrared sensor may be grouped together. data samples from a second type of infrared sensor may be grouped together. Data samples from a metal sensor may be grouped together. The model trainer may train a model using each group of data samples. The resulting model may be configured to receive sampled electronic signal values from the sensor to which the model corresponds and output data indicating whether the firearm is likely in the holster. In some implementations, the model may receive data indicating the period of time between each sampled electronic signal value. In some implementations, the model may be configured to receive the sampled electronic signal values with the time between receiving the sampled electronic signal values being the period of time between the sampling of the electronic signal.

Based on determining that the firearm has been removed from the holster, the camera 120 generates a software-recognized event that indicates the firearm has been removed from the holster (330). In some implementations, the software-recognized event may be in a message queuing telemetry transport protocol. In some implementations, the camera 120 may provide the software-recognized event to an event publish/subscribe service. The event publish/subscribe service may implement the message queuing telemetry transport protocol.

In response to the software-recognized event that indicates the firearm has been removed from the holster, the camera 120 determines an instruction for a video sensor 130 to record (340). The camera 120 provides the instruction for the video sensor 130 to record (350). In some implementations, the video sensor 130 and/or a controller of the video sensor 130 may subscribe to software-recognized event related to the sensor 106. The video sensor 130 and/or a controller of the video sensor 130 may receive the software-recognized event and based on whether the firearm is in or out of the holster, the video sensor 130 and/or a controller of the video sensor 130 may begin or cease storing video data in the video storage 132.

Figure 4:
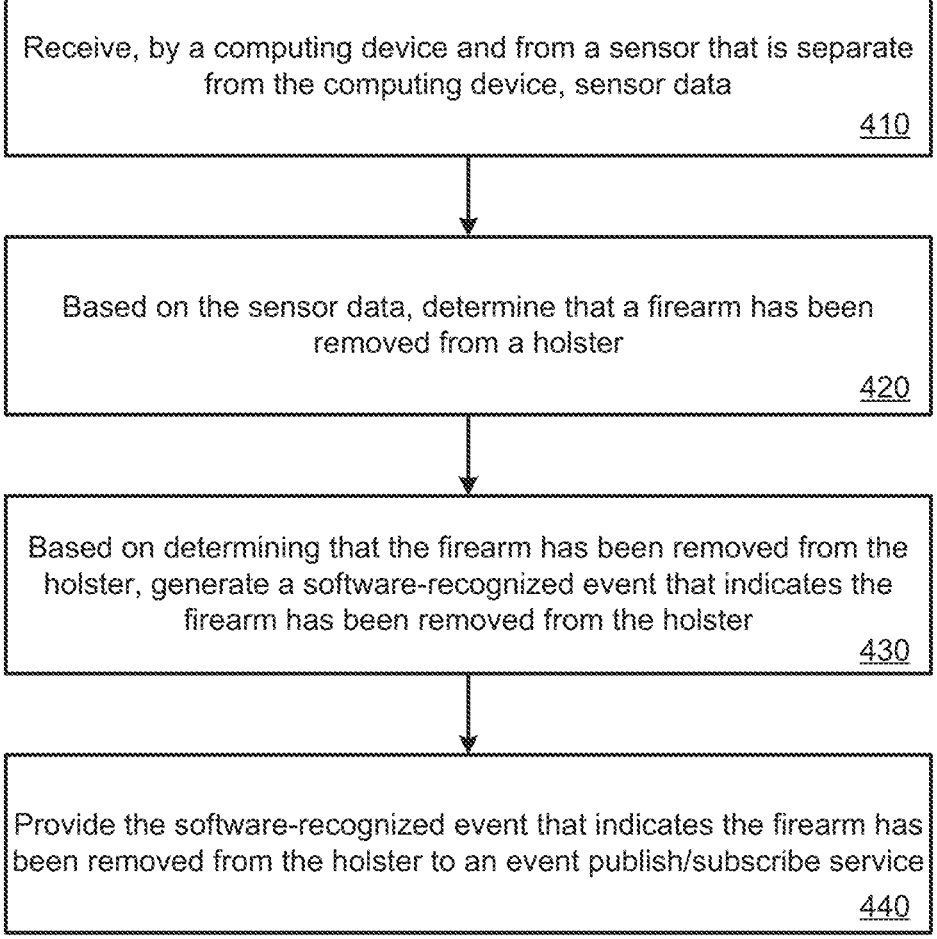
FIG. 4 is a flowchart of an example process for generating a software-recognized event based on whether a firearm is in a holster.

FIG. 4 is a flowchart of an example process 400 for generating a software-recognized event based on whether a firearm 234 is in a holster 204. In general, the process 400 receives sensor data 240 from a sensor 206. The process 400 analyzes the sensor data 240 and determines that the firearm 234 has been removed from the holster 204. The process 400 generates a software-recognized event that indicates whether the firearm 234 is in the holster 204. The process 400 will be described as being performed by the system 200 of FIG. 2 and will include references to components of the sensor 206, hub 238, and the camera 220 in FIG. 2.

The hub 238 receives, from a sensor that is separate from the camera 120, sensor data (410). In some implementations, the hub 238 and the sensor 206 communicate over a wireless communication channel. In some implementations, the sensor 206 is configured to sample an electronic signal generated by a sensor device 208 of the sensor 106 and transmit the sampled electronic signal to the hub 238. The sensor data may include the sampled electronic signal. In some implementations, the sensor 206 is configured to transmit the sampled electronic signal to the hub 238 in response to determining that the sampled electronic signal satisfies a sampled electronic signal threshold. In some implementations, the sensor 206 is configured to sample the electronic signal at varying sampling frequencies based on the sampled electronic signal.

Based on the sensor data, the hub 238 determines that a firearm 234 has been removed from a holster 204 (420). In some implementations, the hub 238 may analyze the sensor data 240 using one or more rules and/or models described above in relation to FIG. 3. The hub 238 may select a rule or model based on the type of sensor 206. For example, the hub 238 may select a rule or model that is configured to receive sensor data collected from a metal sensor based on the sensor 206 being a metal sensor.

Based on determining that the firearm has been removed from the holster, the hub 238 generates a software-recognized event that indicates the firearm has been removed from the holster 204 (430). In some implementations, the software-recognized event may be in a message queuing telemetry transport protocol.

The hub 238 provides the software-recognized event that indicates the firearm has been removed from the holster to an event publish/subscribe service 228 (440). The event publish/subscribe service may implement the message queuing telemetry transport protocol. The camera 220 may include an event subscriber 236 that subscribes to software-recognized event related to the firearm 234 and/or the sensor 206. The camera 220 may receive the software-recognized event that indicates the firearm 234 has been removed from the holster 204. The event subscriber 236 may instruct the video sensor 230 to store video data in the video storage 232.

Figure 5:
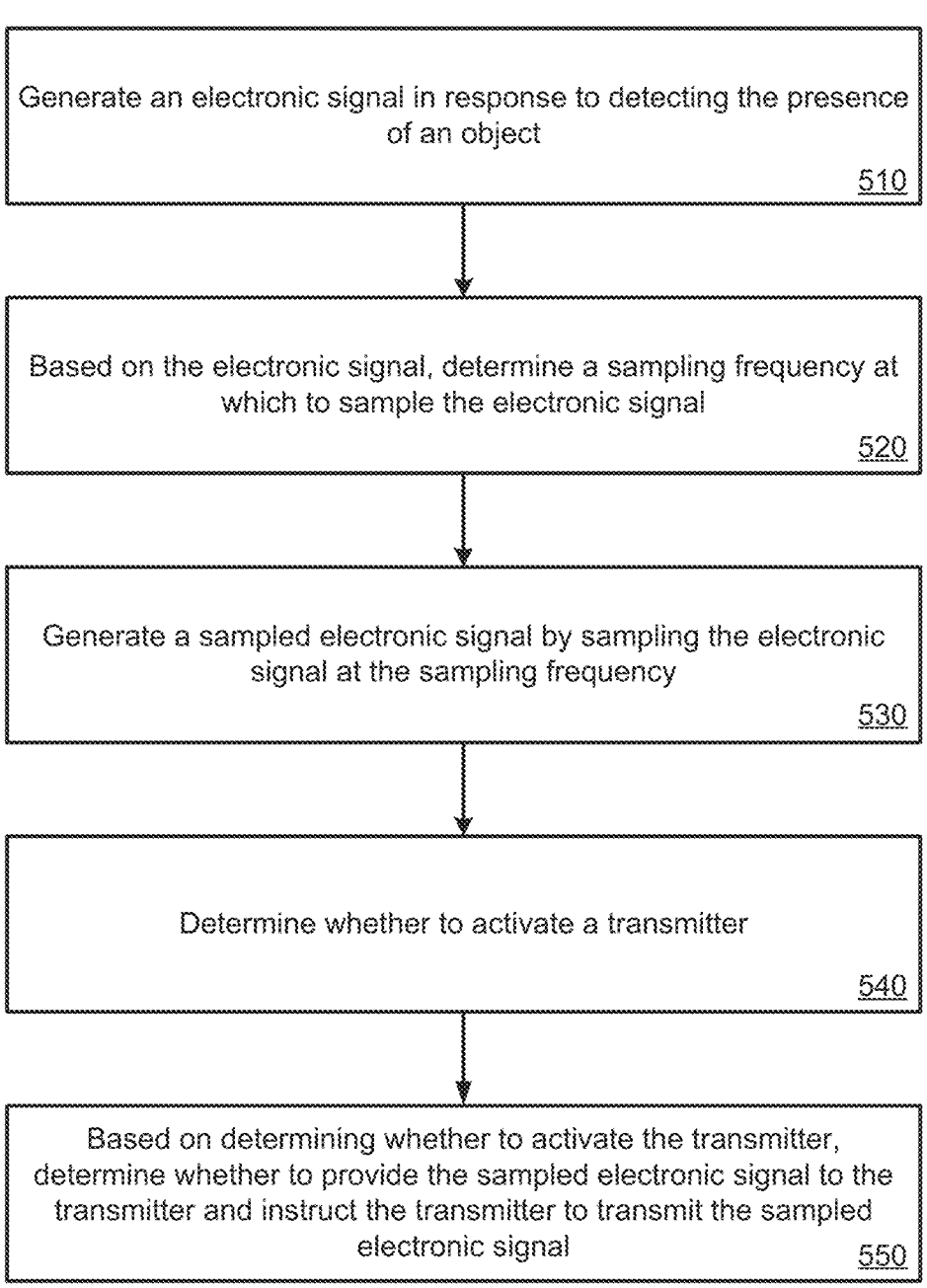
FIG. 5 is a flowchart of an example process for sampling and outputting an electronic signal generated by a sensor device.

FIG. 5 is a flowchart of an example process 500 for sampling and outputting an electronic signal generated by a sensor device. In general, the process 500 generates an electronic signal based on the presence of an object. The process 500 determines a sampling frequency for the electronic signal and determines whether to output the sampled electronic signal. The process 500 will be described as being performed by the system 100 of FIG. 1 and will include references to components of the FIG. 1. In some implementations, the process 500 may be preformed by the system 200 of FIG. 2.

The sensor device 108 of the sensor 106 generates an electronic signal in response to detecting the presence of an object (510). The sensor device 108 may be any type of device that is configured to generate an electronic signal in the presence of an object. The sensor device 108 may generate an electronic signal that varying based on the distance between the object and the sensor device 108. For example, the sensor device 108 may be a metal sensor, infrared sensor, proximity detector, and/or any other similar type of sensing device. The electronic signal may vary between two boundary values. One of those boundary values may indicate that the object is as close as possible to the sensor device 108. The other boundary value may indicate that the object is not detected by the sensor device 108.

Based on the electronic signal, the sampling frequency identifier 112 of the sensor 106 determines a sampling frequency at which to sample the electronic signal (520). The sampling frequency identifier 112 may be configured to adjust the sampling frequency based on the value of the electronic signal. The sampling frequency identifier 112 may select a lower frequency if the value of the electronic signal is within a threshold value of the boundary values. This may indicate that location of the firearm 134 is stable. The sampling frequency identifier 112 may select a higher frequency if the value of the electronic signal is within an additional threshold value of a center value in the middle of the two boundary values. This may indicate that the location of the firearm 134 is changing.

The sensor device sampler 110 of the sensor 106 generates a sampled electronic signal by sampling the electronic signal at the sampling frequency (530). The sensor device sampler 110 may receive an instruction from the sampling frequency identifier 112 regarding the sampling frequency of the electronic signal from the sensor device 108.

The transmitter controller 118 of the sensor 106 determines whether to activate a transmitter (540). The transmitter controller 118 may be configured to activate or deactivate the transmitter 116 based on the value of the sampled electronic signal. The transmitter controller 118 may compare the value of the sampled electronic signal to a range. The range may include the center value in the middle of the two boundary values. If the value of the sampled electronic signal is within that range, then the transmitter controller 118 may activate the transmitter 116. If the value of the sampled electronic signal is outside that range, then the transmitter controller 118 may deactivate the transmitter 116.

Based on determining whether to activate the transmitter, the sensor 106 determines whether to provide the sampled electronic signal to the transmitter and instruct the transmitter to transmit the sampled electronic signal (550). If the transmitter 116 is active, then the sensor device sampler 110 may provide the sampled electronic signal to the transmitter 116. The transmitter 116 may transmit the sampled electronic signal to the receiver 122 of the camera 120. If the transmitter 116 is inactive, then the sensor device sampler 110 may bypass providing the sampled electronic signal to the transmitter 116. In this case, the receiver 122 may not receive the sampled electronic signal from the transmitter 116.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented system, comprising:
at least one processor;
at least one sensor, wherein the at least one sensor comprises a sampling frequency identifier and a sensor device sampler;
one or more memory devices storing instructions that, when executed, cause the processor to perform operations comprising:
in response to detecting a presence of a firearm, causing the at least one sensor to generate an electronic signal that is based on a distance between the firearm and the sensor, wherein the electronic signal varies between two boundary levels;
determining, by the sampling frequency identifier and based on the electronic signal, a sampling frequency at which to sample the electronic signal;
generating, by the sensor device sampler, a sampled electronic signal by sampling the electronic signal at the sampling frequency; and
determining whether to activate a transmitter based on the sampled electronic signal.

2. The computer-implemented system of claim 1, wherein the operations further comprise:
in response to determining to activate the transmitter, transmitting the sampled electronic signal to a camera comprising a sensor data analyzer configured to analyze the sampled electronic signal;
analyzing the sampled electronic signal using the sensor data analyzer; and
determining whether the firearm has been removed from a holster based on the analyzed sampled electronic signal.

3. The computer-implemented system of claim 2, wherein the operations further comprise:
in response to determining the firearm has been removed from the holster:
activating one or more of a recording feature of the camera or a microphone of the camera; and
generating one or more instructions to store at least one of video data associated with the recording feature or audio data from the microphone.

4. The computer-implemented system of claim 2, wherein the operations further comprise:
outputting, by a model, a confidence score associated with a likelihood the firearm has been removed from the holster;
comparing the confidence score to a confidence score threshold; and
determining the firearm has been removed from the holster based on the comparison; and
generating an event indicating the firearm has been removed from the holster.

5. The computer-implemented system of claim 4, wherein the model is a machine learning model.

6. The computer-implemented system of claim 4, wherein in response to determining the event occurred within a threshold geographic distance of an event subscriber, activating a recording feature of the camera.

7. The computer-implemented system of claim 4, wherein:
the camera comprises a location detector; and
the operations further comprise generating an event indicating a location of the firearm based on the location detector.

8. The computer-implemented system of claim 1, wherein the operations further comprise:
determining to activate the transmitter based on a transmitter activation threshold associated with one or more of the sampled sensor data or the sampling frequency; and
determining to deactivate the transmitter based on a transmitter deactivation threshold associated with the one or more of the sampled sensor data or the sampling frequency.

9. The computer-implemented system of claim 1, wherein the sensor device sampler is configured to sample the electronic signal at varying frequencies based on the sampled electronic signal.

10. The computer-implemented system of claim 1, wherein the operations further comprise:
comparing a value of the sampled electronic signal to a range, wherein the range is associated with the two boundary levels; and
in response to determining a value of the sampled electronic signal is outside the range, deactivating the transmitter.

11. A computer-implemented method, comprising:
in response to detecting the presence of a firearm, causing at least one sensor to generate an electronic signal that is based on a distance between the firearm and the sensor, wherein the electronic signal varies between two boundary levels;
determining, by a sampling frequency identifier and based on the electronic signal, a sampling frequency at which to sample the electronic signal;
generating, by the sensor device sampler, a sampled electronic signal by sampling the electronic signal at the sampling frequency; and
determining whether to activate a transmitter based on the sampled electronic signal.

12. The computer-implemented method of claim 11, further comprising:
in response to determining to activate the transmitter, transmitting the sampled electronic signal to a camera comprising a sensor data analyzer configured to analyze the sampled electronic signal;
analyzing the sampled electronic signal using the sensor data analyzer; and
determining whether the firearm has been removed from a holster based on the analyzed sampled electronic signal.

13. The computer-implemented method of claim 12, further comprising:
in response to determining the firearm has been removed from the holster:
activating one or more of a recording feature of the camera or a microphone of the camera; and
generating one or more instructions to store at least one of video data associated with the recording feature or audio data from the microphone.

14. The computer-implemented method of claim 12, further comprising:
outputting, by a model, a confidence score associated with a likelihood the firearm has been removed from the holster;
comparing the confidence score to a confidence score threshold;

determining the firearm has been removed from the holster based on the comparison; and generating an event indicating the firearm has been removed from the holster.

15. The computer-implemented method of claim 14, wherein the model is a machine learning model.

16. The computer-implemented method of claim 14, wherein in response to determining the event occurred within a threshold geographic distance of an event subscriber, activating a recording feature of the camera.

17. The computer-implemented method of claim 14, further comprising generating an event indicating a location of the firearm based on a location detector associated with the camera.

18. The computer-implemented method of claim 11, further comprising:

determining to activate the transmitter based on a transmitter activation threshold associated with one or more of the sampled sensor data or the sampling frequency; and determining to deactivate the transmitter based on a transmitter deactivation threshold associated with the one or more of the sampled sensor data or the sampling frequency.

19. The computer-implemented method of claim 11, wherein the sensor device sampler is configured to sample the electronic signal at varying frequencies based on the sampled electronic signal.

20. The computer-implemented method of claim 11, further comprising:

comparing a value of the sampled electronic signal to a range, wherein the range is associated with the two boundary levels; and in response to determining a value of the sampled electronic signal is outside the range, deactivating the transmitter.

* * * * *